(12) United States Patent
Flury

(10) Patent No.: US 8,288,896 B2
(45) Date of Patent: Oct. 16, 2012

(54) 3N-4-LEVEL VOLTAGE INVERTER

(75) Inventor: Guy Flury, Balschwiller (FR)

(73) Assignee: Converteam Technology Ltd., Warwickshire (GB)

(*) Notice: Subject to any disclaimer, the term of this patent is extended or adjusted under 35 U.S.C. 154(b) by 359 days.

(21) Appl. No.: 12/658,265

(22) Filed: Feb. 9, 2010

(65) Prior Publication Data
US 2010/0219692 A1    Sep. 2, 2010

(30) Foreign Application Priority Data
Feb. 11, 2009   (FR) ...................... 09 50842

(51) Int. Cl.
*H02M 7/00*   (2006.01)
(52) U.S. Cl. ........... 307/112; 307/84; 307/113; 307/151
(58) Field of Classification Search .................. 307/112, 307/113, 151
See application file for complete search history.

(56) References Cited

U.S. PATENT DOCUMENTS

| 4,270,163 A | 5/1981 | Baker .............................. 363/43 |
| 2006/0114623 A1 | 6/2006 | Domoto et al. .................. 361/18 |

FOREIGN PATENT DOCUMENTS
FI     A-2 437 102     4/1980

*Primary Examiner* — Adi Amrany
(74) *Attorney, Agent, or Firm* — Davidson, Davidson & Kappel, LLC

(57) ABSTRACT

The invention relates to a 3N-4-level (N≧3) voltage converter including:
- 3N-5 direct voltage generators (1, 2, 3, 4) connected between two input voltage terminals ($V_+$, $V_-$),
- two lateral commutation branches (10, 11), each connected between an output terminal and an input voltage terminal ($V_+$, $V_-$) and comprising N-1 series connected commutation cells (20, 21, 22, 23),
- 2N-4 central commutation branches (12, 13), each comprising a switch bidirectional in terms of voltage and current and being connected between two commutation cells of a lateral branch (10, 11) and two generators, and
- N-2 pairs of diode cells (16) each connected to two of the 2N-4 central commutation branches (12, 13). The diodes (14, 15) of one pair are series connected, in the same direction, and are connected together by a middle point connected between two generators.

11 Claims, 15 Drawing Sheets

3N-4-LEVEL VOLTAGE INVERTER

This claims the benefit of French Patent Application FR 09 50842, filed on Feb. 11, 2009 and hereby incorporated by reference herein.

The present invention relates to a 3N-4-level voltage inverter, N being an integer greater than or equal to 3, of the type comprising:

two input voltage terminals;

N-1 direct voltage generators which are series connected between the two input voltage terminals and are connected together by a middle point; two terminal generators of the N-1 generators being connected directly to one of the two input voltage terminals;

two first commutation branches each connected between an output terminal and one of the two input voltage terminals; each commutation branch comprising N-1 series connected commutation cells connected together by a middle point;

a controller for the commutation cells of the two first commutation branches;

N-2 pairs of diode cells; each pair of diode cells being connected between a middle point of one of the two first commutation branches and a middle point of the other of the two first commutation branches; each diode cell of the N-2 pairs of diode cells comprising at least one diode; the diodes of the diode cells of one pair of diode cells being series connected, in the same direction, and being connected together by a middle point connecting two consecutive generators of the N-1 direct voltage generators.

BACKGROUND

A number of architectures of inverters of this type are already known, for example diode-clamped inverters. Document FR-A-2 437 102 describes an inverter of the neutral point clamped type designated by the English acronym NPC, which corresponds to the above definition and in which diodes connected to a middle point between two consecutive generators, called the reference point, serve to distribute the input voltage between the transistors in the blocked state of the two first commutation branches.

The output current and voltage of such an architecture are rich in harmonics, requiring the use of filter means, which presents problems for variable-speed applications such as use with motors, for example. The addition of supplementary levels relative to a three-level NPC-type inverter allows the voltage harmonics generated by the converter to be reduced, thus enabling the associated sinus filter to be reduced in size or even eliminated altogether. However, the change from a three-level NPC-type inverter to a five-level NPC-type inverter, for example, requires the use of an additional four IGBT transistors and twelve diodes, which increases the costs considerably.

SUMMARY OF THE INVENTION

It is an object of the invention is to provide a novel topology of multi-level external point piloted converters designated by the English acronym EPP, increasing the power/cost ratio while reducing the voltage harmonics generated by the converter for a moderate additional cost.

The present invention provides to a voltage inverter of the above-mentioned type, characterized in that the N-1 generators comprise 3N-5 series connected elementary direct voltage generators; the two terminal generators of the N-1 generators connected directly to one of the two input voltage terminals comprising two elementary direct voltage generators and the other generators of the N-1 generators comprising three elementary generators; the elementary generators of one generator being series connected by a middle point;

and in that it comprises:

2N-4 other commutation branches which are each connected between one of the middle points connecting two elementary generators of one generator and one of the middle points connecting two commutation cells of one commutation branch; each branch of the 2N-4 other commutation branches comprising a pair of commutation cells bidirectional in terms of voltage and current; the two commutation cells of one pair of commutation cells bidirectional in terms of voltage and current being connected by a middle point;

a controller for effecting commutation of the commutation cells of said 2N-4 other commutation branches;

the pairs of diode cells are each connected between the middle point of one of the two first commutation branches and the middle point of the other of the two first commutation branches by the respective middle points of the pairs of commutation cells bidirectional in terms of voltage and current of two of the 2N-4 other commutation branches connected between the middle point connecting the two elementary generators of one generator of the N-1 direct voltage generators and the middle point connecting two commutation cells of one commutation branch.

According to particular embodiments, the voltage inverter has one or more of the following features:

the two commutation cells of one pair of commutation cells bidirectional in terms of voltage and current each comprise at least one switch bidirectional in terms of current and are connected in series head-to-tail and are connected by the middle point;

each of the 2N-2 commutation cells of the two first commutation branches comprises at least one switch bidirectional in terms of current, so that all the bidirectional switches of the 2N-2 commutation cells are series connected and are connected in the same direction;

the controller for effecting commutation of the 2N-2 commutation cells of the two first commutation branches are means for effecting the simultaneous commutation of the at least one bidirectional switch of one commutation cell;

the controller for effecting commutation of the commutation cells of said 2N-4 other commutation branches are means for effecting the simultaneous commutation of the commutation cells of one pair of commutation cells bidirectional in terms of voltage and current of each of said 2N-4 other commutation branches; the commutation of each commutation cell of each of said 2N-4 other commutation branches being effected by the commutation of the at least one bidirectional switch of said commutation cell;

the 3N-5 generators are identical and are to impose the same voltage;

in order to conserve equipotentiality at the terminals of each commutation cell and of each diode cell:

the diode cells, connected directly to a pair of commutation cells bidirectional in terms of voltage and current connected to a middle point between two elementary generators of one of the two terminal generators of the N-1 generators connected directly to one of the two input voltage terminals, comprise a diode of the same direction as their diode cell;

the other diode cells comprise two series connected diodes connected in the same direction;

the commutation cells of the 2N-4 other commutation branches connected directly to a middle point between two elementary generators of one of the two terminal generators of the N−1 generators connected directly to one of the two input voltage terminals comprise a switch bidirectional in terms of current;

the commutation cells of the two first commutation branches connected directly to one of the two input voltage terminals or to the output terminal of a current comprise two series connected switches bidirectional in terms of current connected in the same direction and controlled simultaneously by the control unit;

the commutation cells of the 2N−4 other commutation branches connected directly to a middle point between two elementary generators of the other generators of the N−1 generators consisting in three elementary generators comprise two series connected switches bidirectional in terms of current connected in the same direction and controlled simultaneously by the control unit; and the other commutation cells of the two first commutation branches and the other commutation cells of the 2N−4 other commutation branches comprise three series connected switches bidirectional in terms of current connected in the same direction and controlled simultaneously by the control unit;

each of the switches bidirectional in terms of current of the commutation cells comprises an IGBT transistor and a diode connected in antiparallel;

each IGBT transistor has a balancing resistor in parallel in order to ensure a maximum voltage at its terminals; and each diode has a balancing resistor in parallel in order to ensure a maximum voltage at its terminals.

BRIEF DESCRIPTION OF THE DRAWINGS

The invention will be better understood upon reading the following description, which is given solely by way of example and with reference to the drawings, in which.

DETAILED DESCRIPTION

The present invention relates to a 3N−4-level voltage inverter, where N is an integer greater than or equal to 3.

Figure 1:
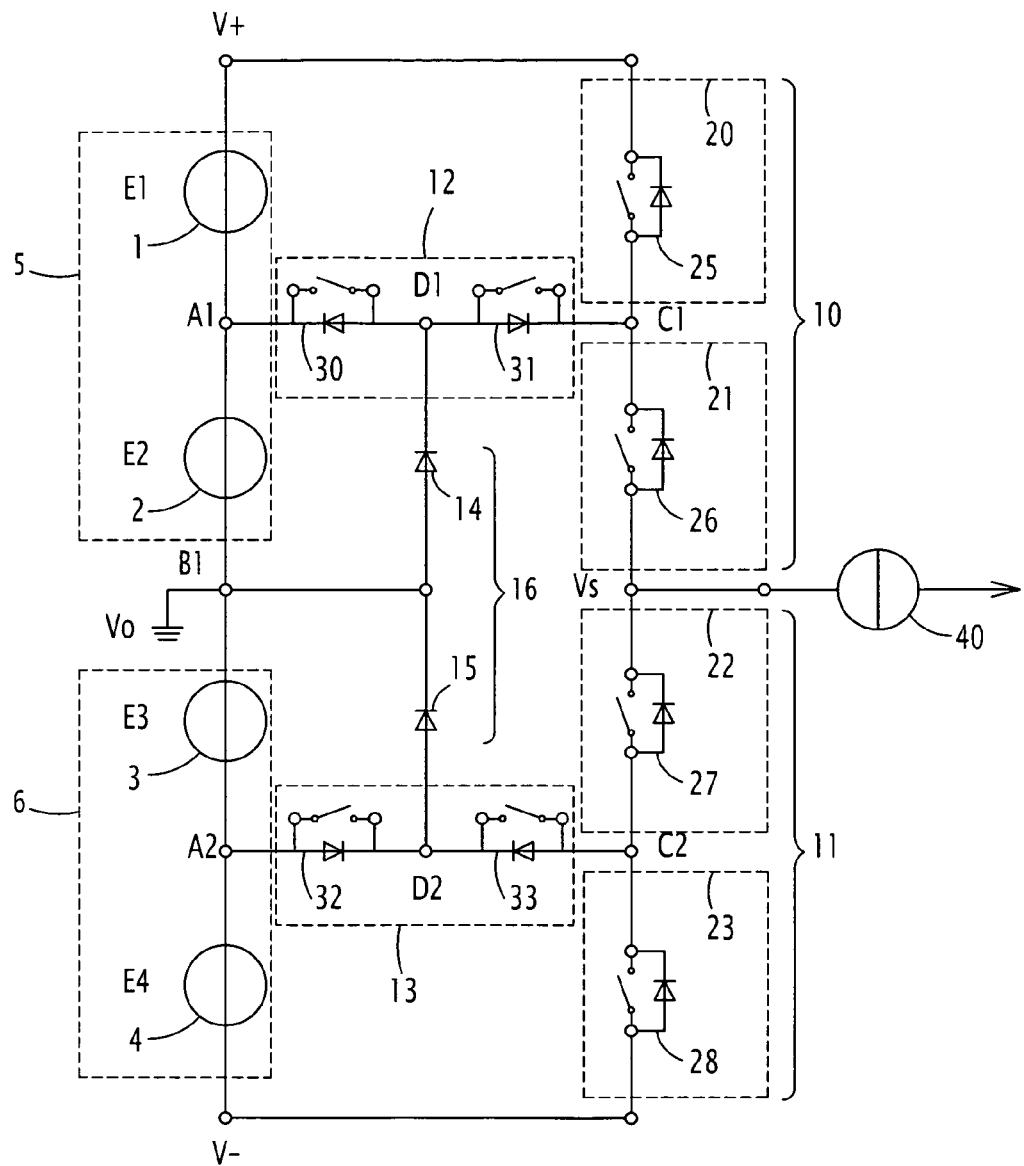
FIG. 1 is a circuit diagram of a five-level voltage inverter according to the invention.

FIG. 1 shows a first embodiment of a 3N−4-level voltage inverter where N=3, that is to say a five-level voltage inverter, which is to supply a high-power motor. It comprises a zero (or neutral) voltage terminal $V_0$ and two input terminals $V_+$ and $V_-$ between which there are connected in series four elementary direct voltage generators 1, 2, 3, 4 defining three middle points $A_1$, $B_1$ and $A_2$ between two elementary generators. The four elementary generators 1, 2, 3, 4, taken in pairs, form two generators 5, 6. When 3N−4 is an uneven number, where N is an integer greater than or equal to 3, the middle point $B_1$ is connected to the zero voltage terminal $V_0$. The inverter also comprises two lateral commutation branches 10, 11 each connected between one of the input terminals $V_+$, $V_-$ and an output terminal $V_S$. Finally, it comprises two other central commutation branches 12, 13 and two diodes 14, 15 forming a pair of diodes 16.

The voltage generators 1, 2, 3, 4 deliver the voltages E1, E2, E3 and E4 volts, respectively, where, for example, E1=E2=E3=E4=E/4, the four voltages then being identical. By way of variation, the voltages are different.

The two lateral commutation branches 10, 11 are identical and each comprise two commutation cells 20, 21 and 22, 23 connected in series by a middle point $C_1$, $C_2$, respectively. Each commutation cell comprises a switch bidirectional in terms of current 25, 26, 27, 28, so that all the switches bidirectional in terms of current are series connected and are connected in the same direction.

The two central commutation branches 12, 13 are identical and are connected between the middle points $A_1$, $C_1$ and $A_2$, $C_2$, respectively. They each comprise two switches bidirectional in terms of current 30, 31 and 32, 33 which are connected in series head-to-tail and are connected by a middle point $D_1$ and $D_2$, respectively.

The two diodes 14, 15 are mounted in series and are connected in the same direction between the middle points $D_1$, $D_2$ of the two central commutation branches 12, 13, so that the cathode of the diode 14 is connected to the middle point $D_1$ and the anode of the diode 15 is connected to the middle point $D_2$. The middle point situated between the two diodes is connected to the middle point $B_1$ between two voltage generators, which is here the zero voltage terminal $V_0$.

Figure 2:
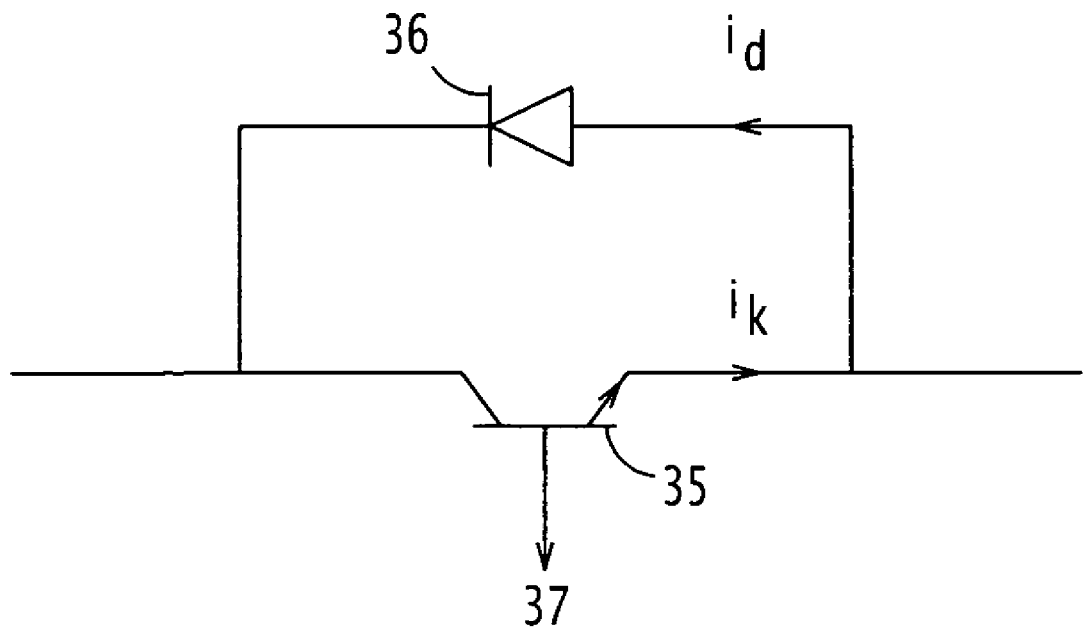
FIG. 2 is an equivalent diagram of a switch bidirectional in terms of current and unidirectional in terms of voltage.

FIG. 2 shows the circuit diagram of a switch bidirectional in terms of current and unidirectional in terms of voltage. Each bidirectional switch of the inverter according to the invention comprises an IGBT transistor 35 and a diode 36 connected in antiparallel, thus ensuring bidirectional current flow paths when the transistor is conducting. These two electronic components are unidirectional in terms of current. Such an assembly allows a unit that is bidirectional in terms of current but unidirectional in terms of voltage to be created. The base of each IGBT transistor is to receive a control signal and is connected to a control unit (not shown).

In the figures, the components are assumed to be perfect, that is to say the voltage at their terminals is zero when they are conducting. Accordingly, the transistor is represented diagrammatically by a perfect switch in the other figures. The control signal is an excitation signal allowing the opening or closing of the switches to be controlled. The pulse-width modulations designated by the acronym PWM and used for controlling the inverter according to the invention are identical to conventional inverters.

The IGBT transistors of the bidirectional switches 30, 31 or 32, 33 of one central branch are controlled simultaneously by the control unit.

FIGS. 3 to 12 show the conduction sequence of the IGBT transistors and of the diodes of a five-level EPP voltage inverter. The various possible configurations of the converter as a function of the current and of the control signal are shown therein. A total of ten steady-state configurations are possible for the five-level EPP inverter, because each level adds two configurations according to the direction of the current. In the figures, the four voltage sources are perfect and a load is represented by a perfect current source 40.

Figure 3:
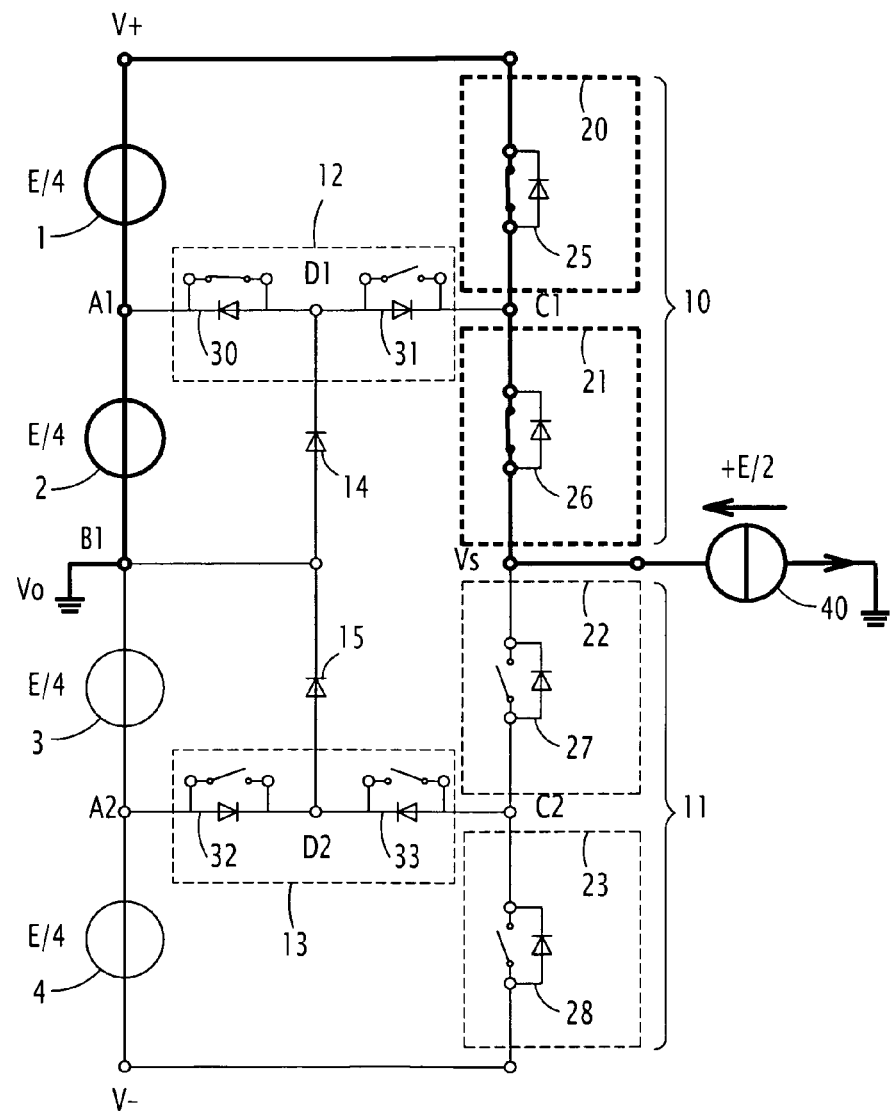
FIGS. 3 to 12 are diagrams of the inverter explaining its operation as presented in FIG. 1.
Figure 4:
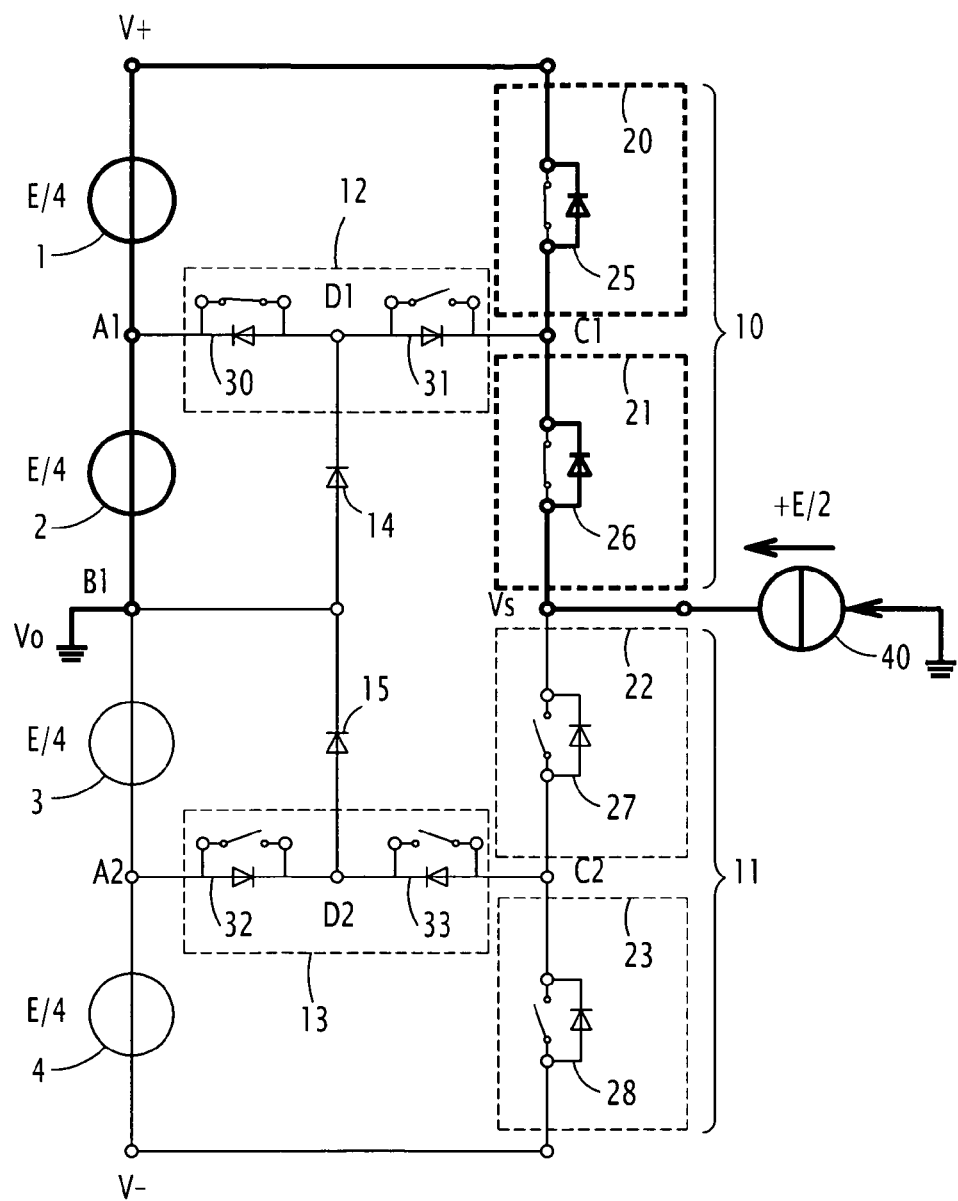

FIGS. 3 and 4 show the voltage/current configuration of the five-level EPP inverter associated with the level +2 control signal. In this level, only the switches 25, 26 and 30 are closed. The current flows in the two commutation cells 20, 21 of the commutation branch 10 and the two generators 1, 2. According to the direction of the current, when the diodes of the bidirectional switches are conducting, the current flows through them; if not, it flows through the transistors. The voltage between the outlet terminal $V_S$ and the zero voltage terminal $V_O$ is then +E/2 volts.

Figure 5:
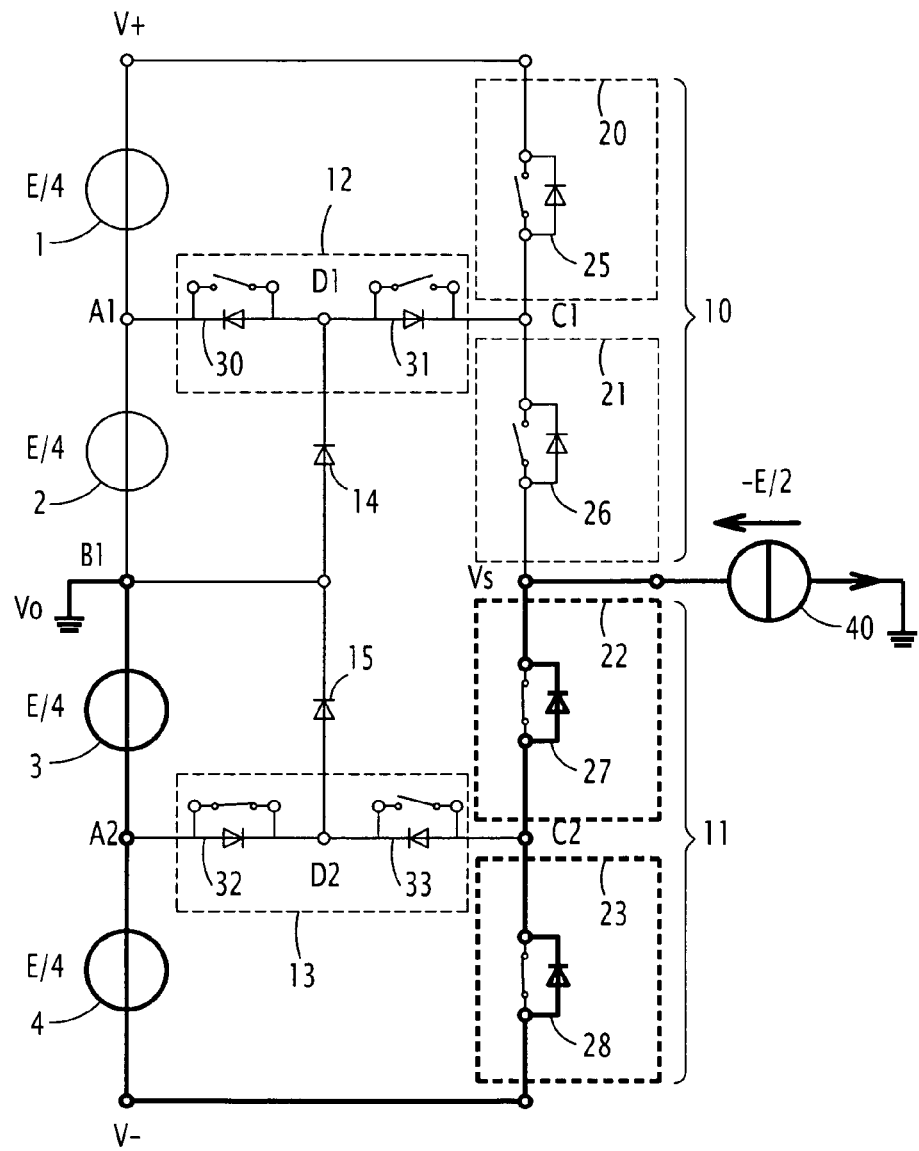
Figure 6:
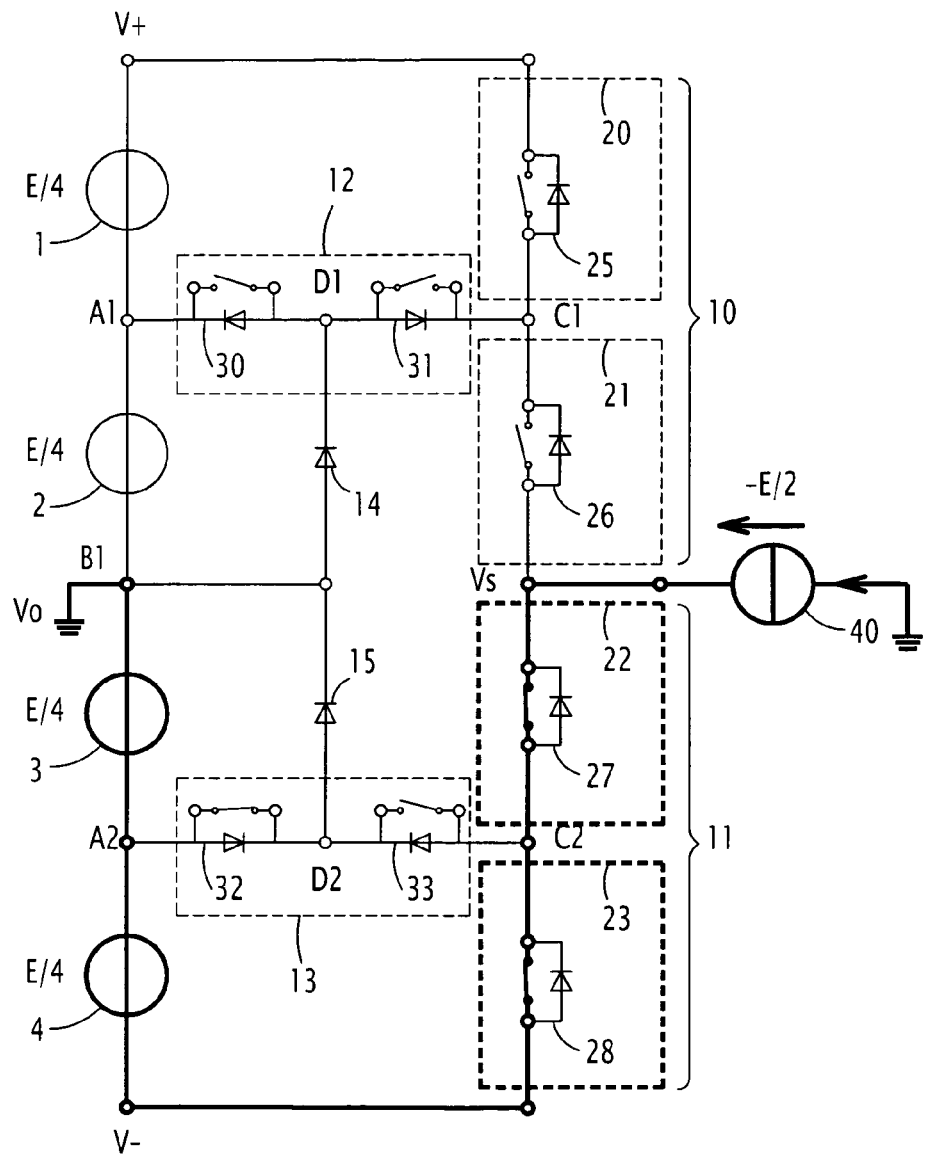
Figure 7:
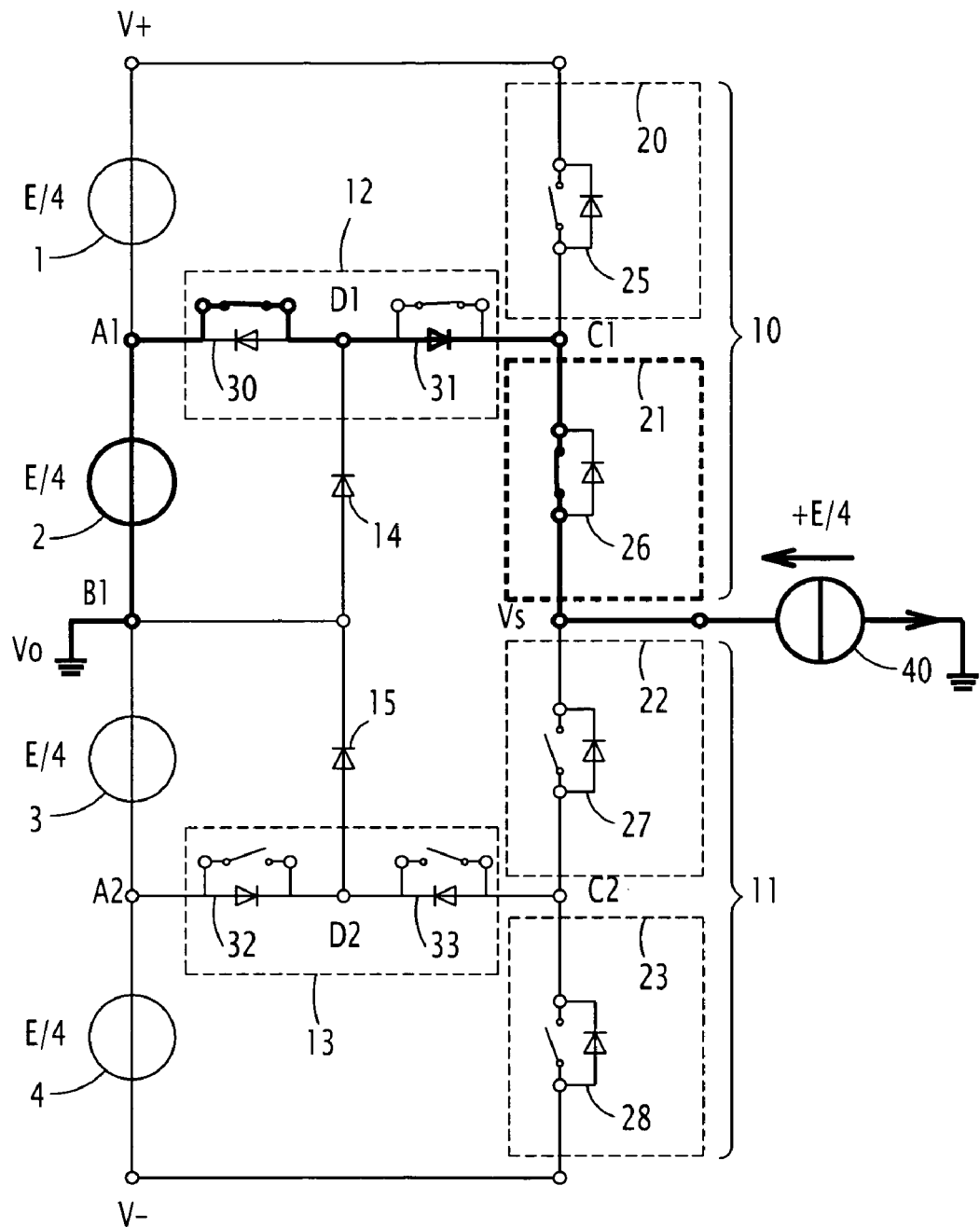
Figure 8:
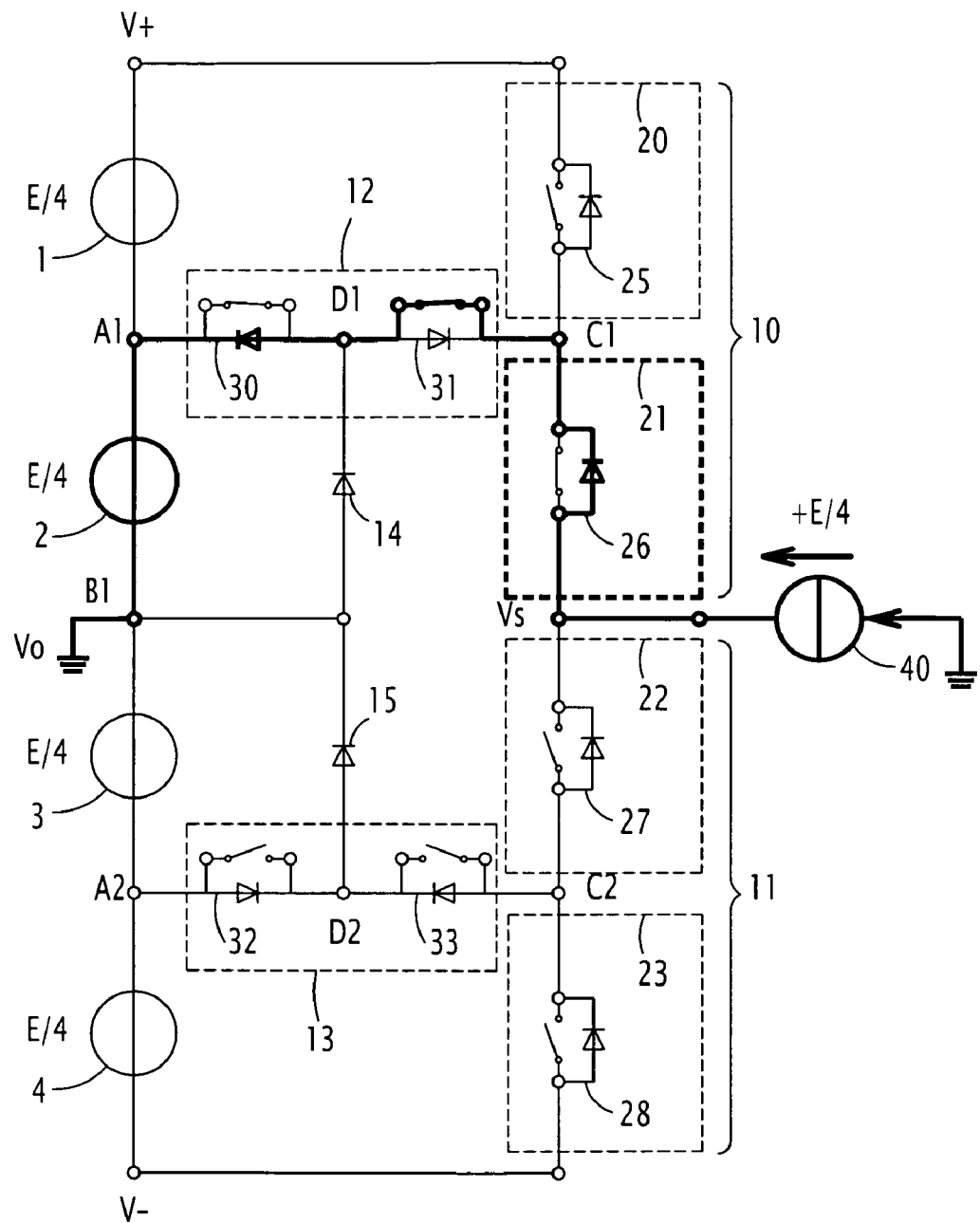
Figure 9:
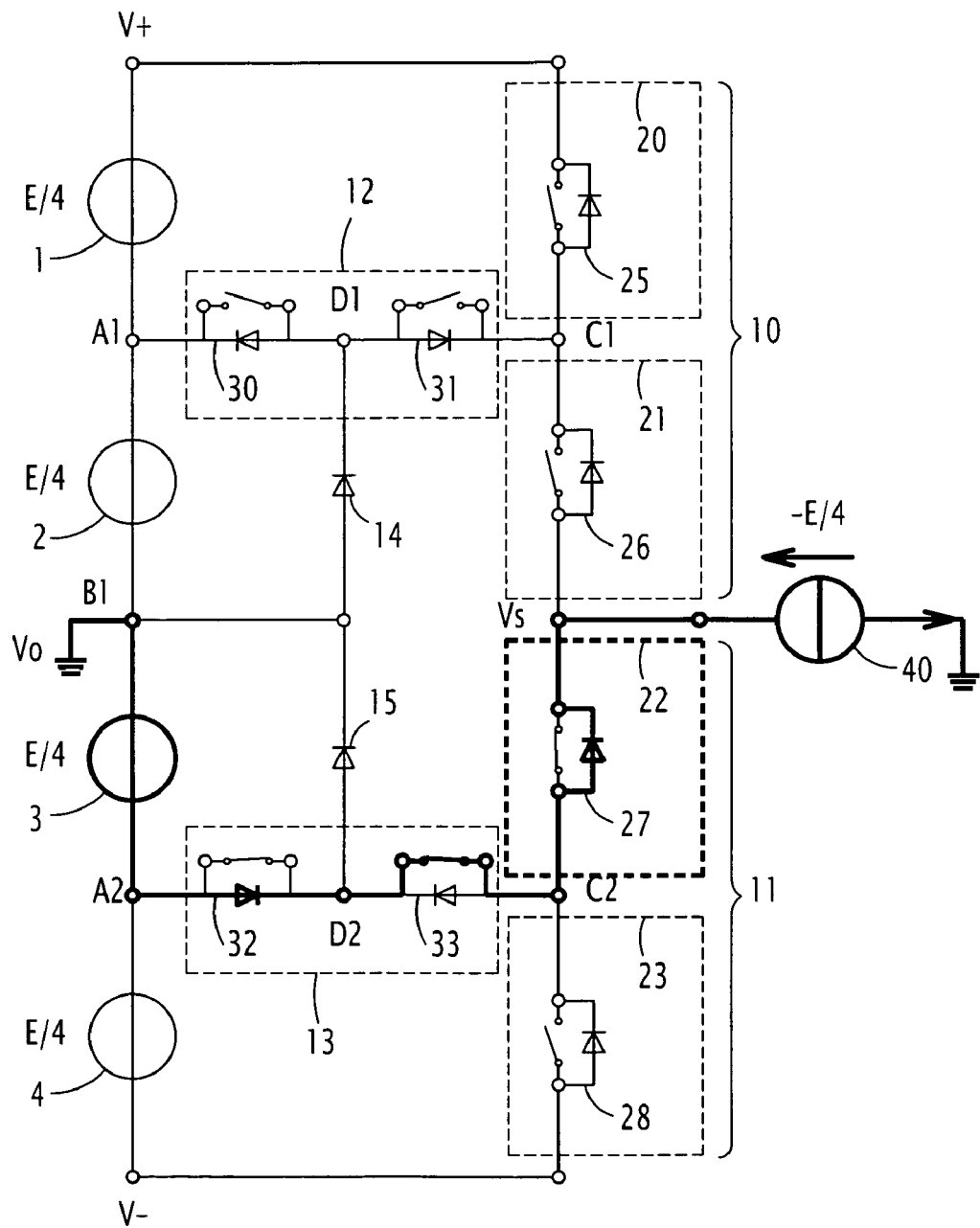
Figure 10:
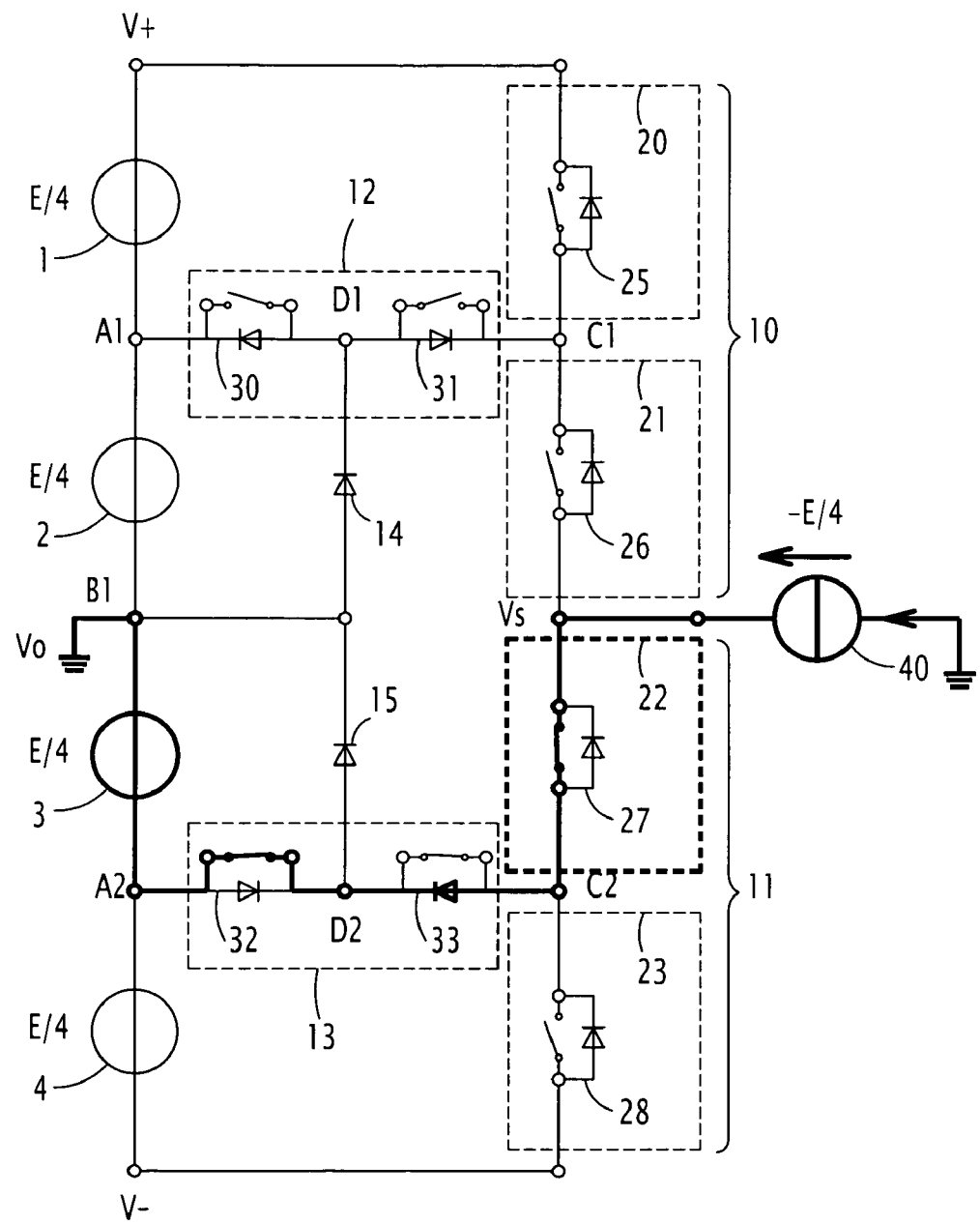

The voltage/current configurations of the five-level inverter associated with the level −2 control signal shown in FIGS. 5 and 6 are symmetrical to those of FIGS. 3 and 4. Their operating principles are analogous and the voltage between the outlet terminal $V_S$ and the zero voltage terminal $V_O$ is then −E/2 volts.

The voltage/current configurations of the five-level EPP inverter associated with the level +1 and −1 control signals are shown in FIGS. 7, 8 and 9, 10, respectively.

In the case of level +1 of the inverter, only the bidirectional switches 30, 31 of the central commutation branch 12 and those of the commutation cell 26 are closed. The current flows in a single commutation cell of the lateral branches and in the central commutation branch directly connected thereto. This description of the operation of the inverter associated with level +1 is applicable to level −1. The voltages between the output terminal $V_S$ and the zero voltage terminal $V_O$ are then +E/4 and −E/4 volts, respectively.

Figure 11:
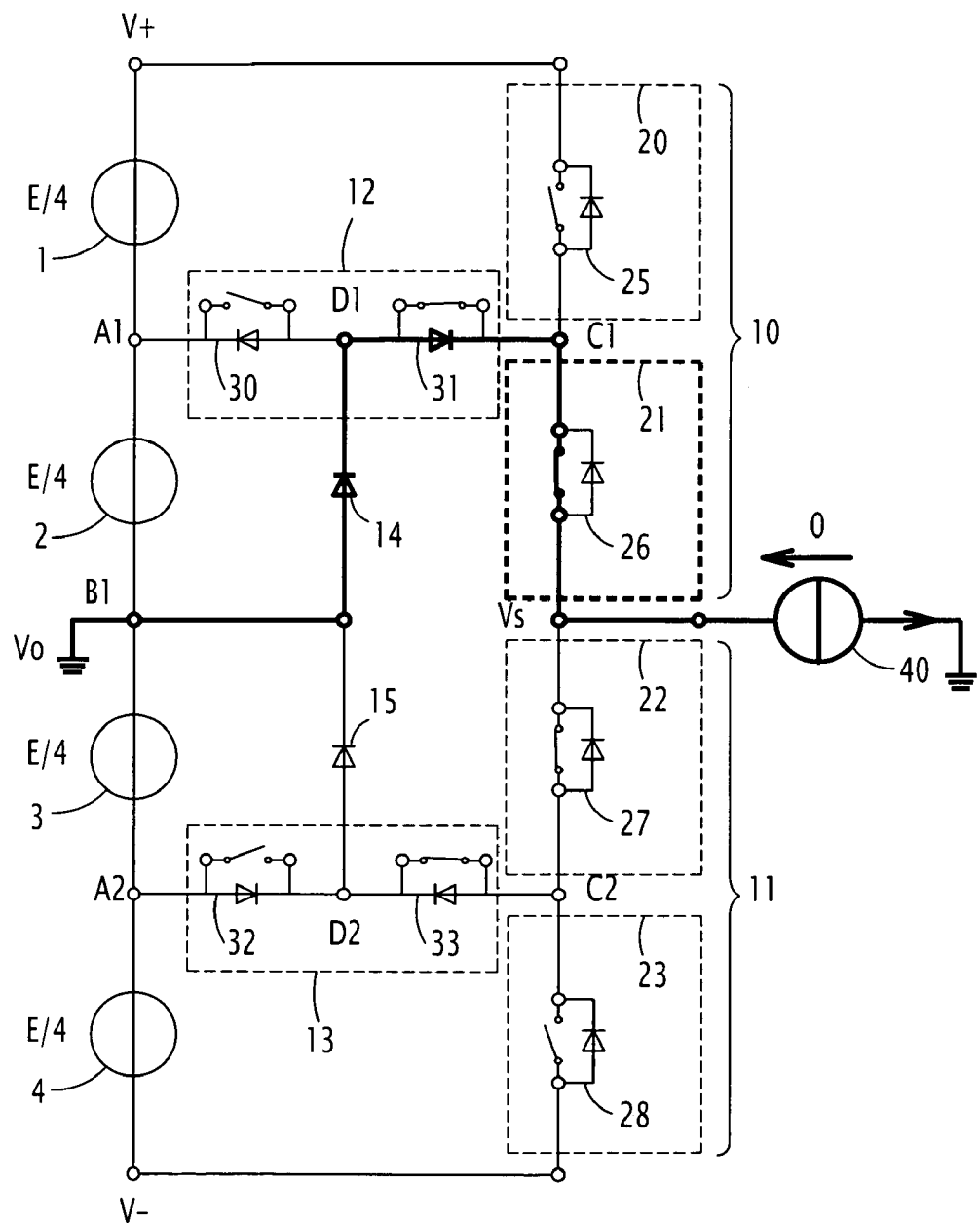
Figure 12:
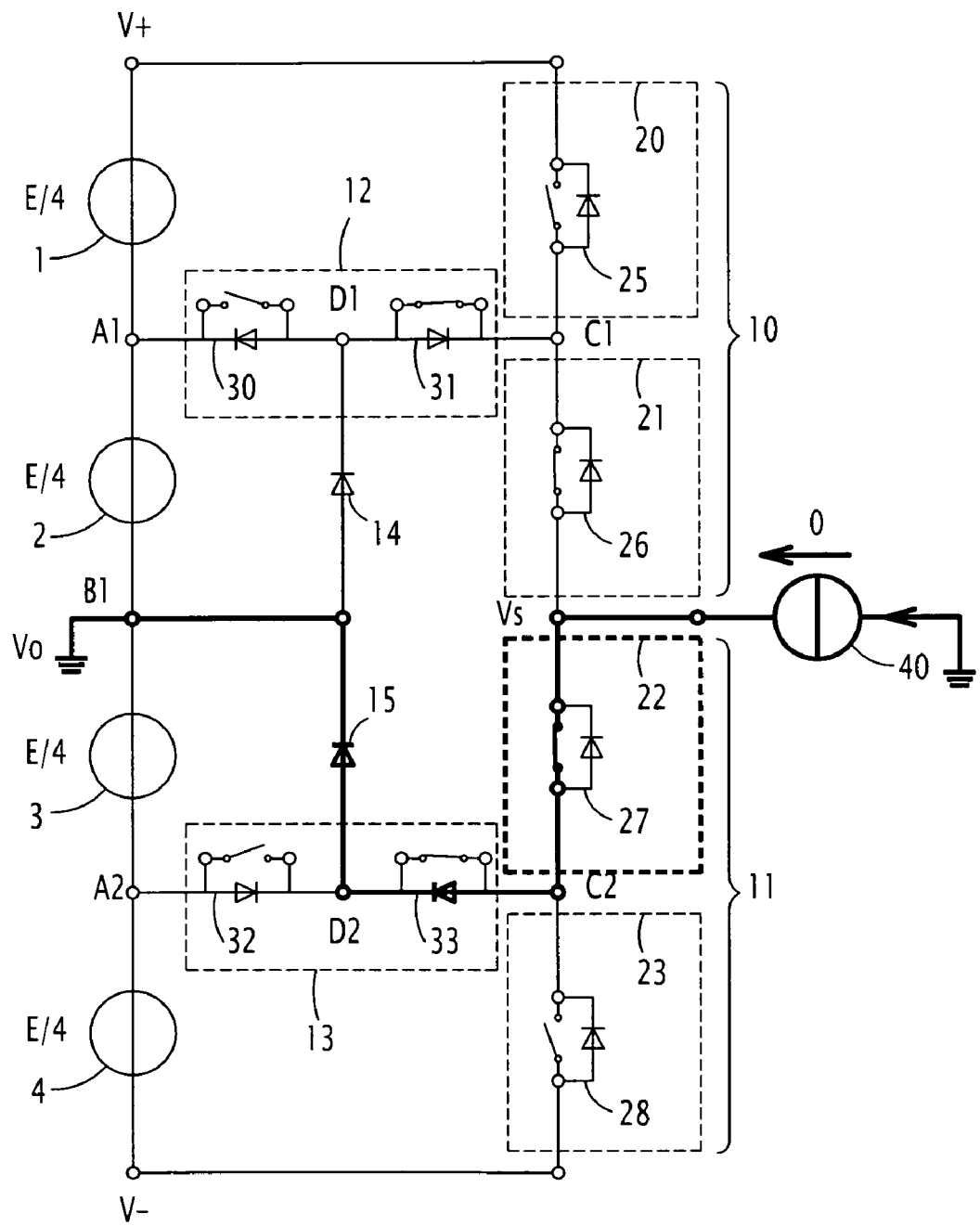

With regard to the voltage/current configurations associated with level 0 of the inverter considered in FIGS. 11 and 12, the current, according to its direction, flows in one of the commutation cells 26 or 27, through the diode of the bidirectional switch 31 or 33 of the central commutation branch 12 or 13, and the diode 14 or 15. The current does not flow in any of the voltage generators. In this level, the switches 31, 33 and those of the commutation cells 21, 22 are closed. The voltage between the output terminal $V_S$ and the zero voltage terminal $V_O$ is then zero.

In the case of an inverter as shown in FIG. 1, if E/4 is the voltage at the terminals of each of the voltage generators 1 to 4, the commutation voltage at the terminals of the bidirectional switches 25 to 28 of the commutation cells 20 to 23 is equal to E/4, with a maximum voltage at the terminals of those cells of E/2.

The five-level inverter so produced has the advantage of adding two additional voltage levels, which reduces the degree of voltage harmonic distortion by a factor of four as compared with a three-level topology.

Figure 13:
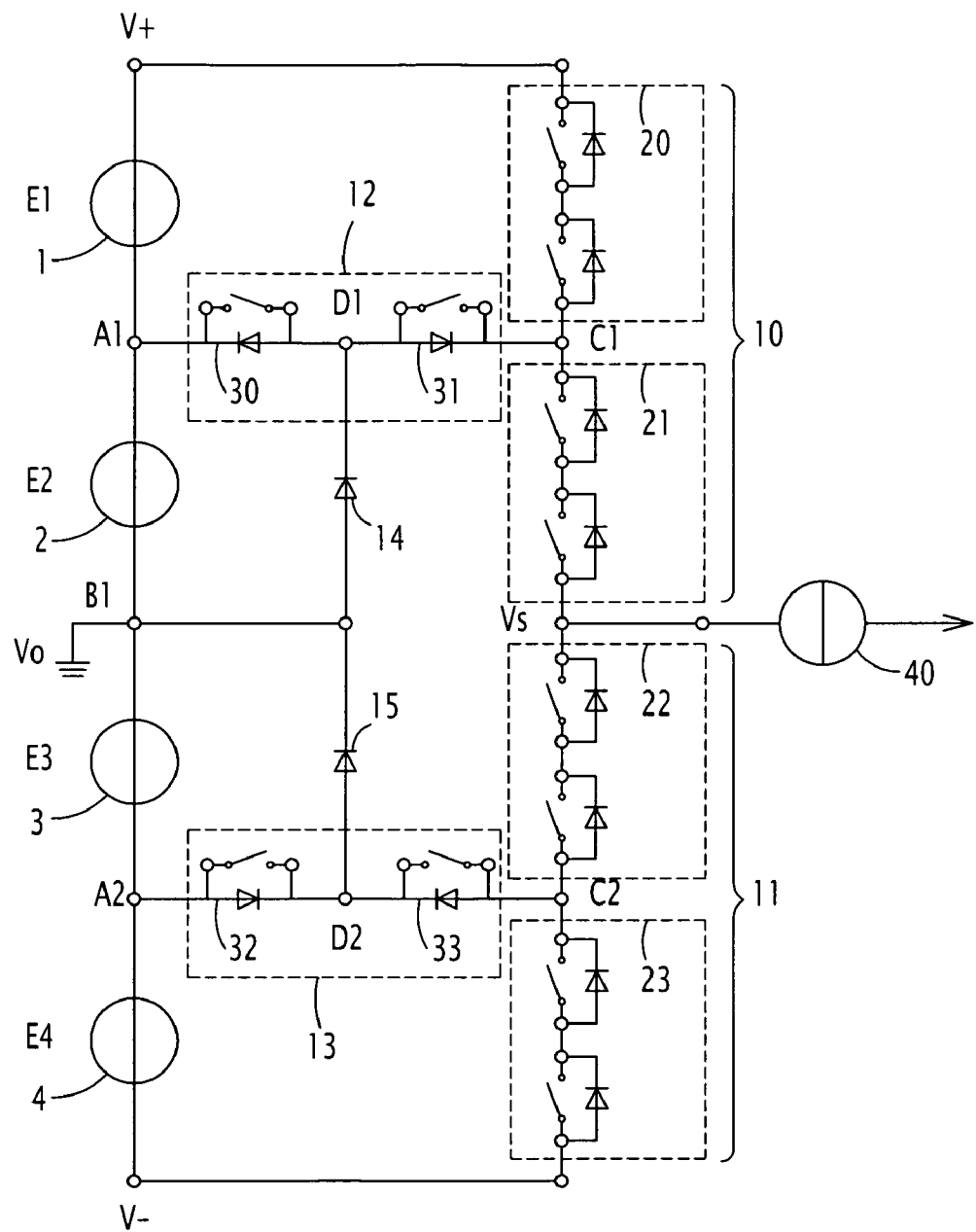
FIG. 13 is a circuit diagram of an inverter according to a different embodiment of the invention.

In another embodiment shown in FIG. 13, each commutation cell 20 to 23 of the lateral branches comprises two series connected switches bidirectional in terms of current, which are connected in the same direction and are controlled simultaneously by the control unit in order to support the maximum reference voltage of E/4.

In the case of an inverter as shown in FIG. 13, if E/4 is the voltage at the terminals of each of the voltage generators 1 to 4, the commutation voltage at the terminals of each of the bidirectional switches of the commutation cells 20 to 23 is divided by two relative to a conventional NPC structure, that is to say E/8. The losses by commutation in these components are therefore divided by two, which allows the commutation frequency to be doubled without increasing the losses.

Consequently, this rapid commutation allows the output current wave form of the inverter to be improved. The advantage that results therefrom is that the associated sinus filter can be reduced in size, or even eliminated altogether, for a moderate additional cost as compared with a conventional five-level NPC inverter having four additional IGBT transistors and 6 diodes removed.

In particular embodiments, additional balancing resistors are advantageously connected in parallel with each active element, that is to say transistor and diode, in order to ensure a maximum voltage of E/4.

Figure 14:
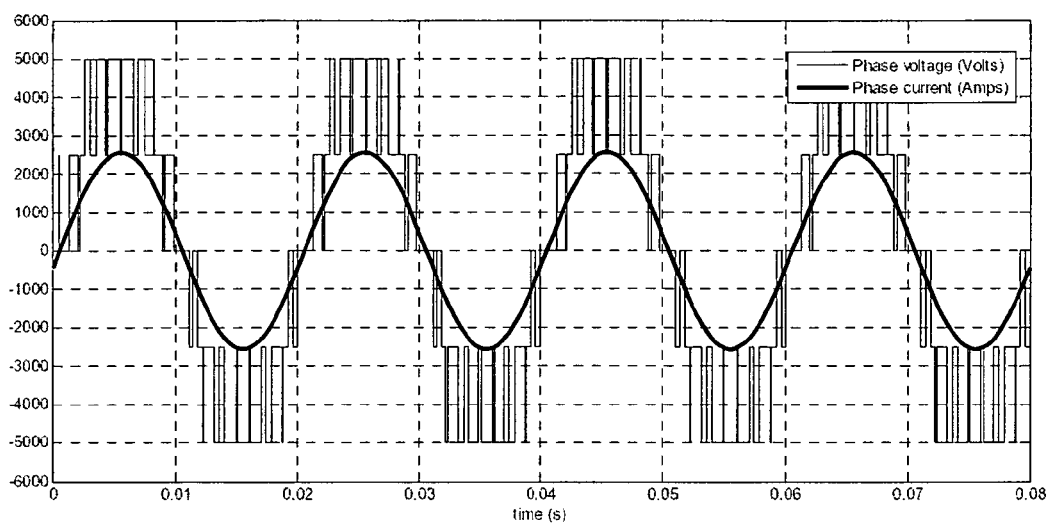
FIG. 14 is a graph showing a wave form obtained by the use of the inverter of FIG. 13.

FIG. 14 shows an example of a phase voltage and current wave form of a five-level external point piloted voltage inverter, obtained with an inverter as described in FIG. 13.

Figure 15:
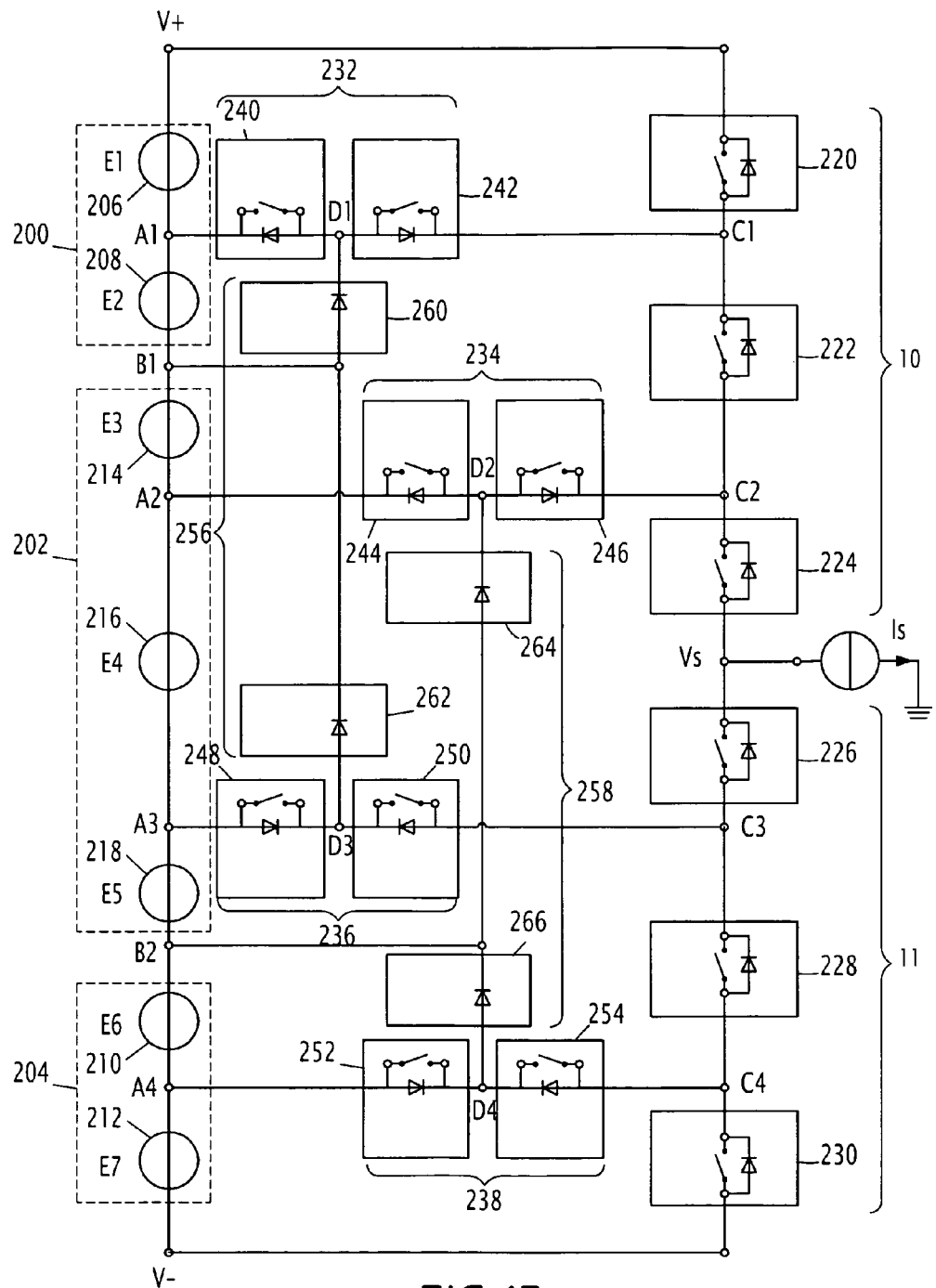
FIG. 15 is a circuit diagram of an eight-level voltage inverter according to the invention.

FIG. 15 shows the circuit diagram of a 3N−4-level voltage inverter, where N=4, that is to say an 8-level voltage inverter, according to the invention. The 8-level voltage inverter comprises two input terminals $V_+$ and $V_-$ between which there are connected in series three direct voltage generators 200, 202, 204, defining two middle points $B_1$ and $B_2$ between two generators. The two generators 200, 204 connected directly to one of the two input terminals $V_+$, $V_-$, called the terminal generators, comprise two series connected elementary generators 206, 208 and 210, 212, respectively, each defining a middle point $A_1$, $A_4$ between two elementary generators 206, 208 and 210, 212 of one generator 200, 204. The generator 202 is composed of three elementary generators 214, 216, 218 defining two middle points $A_2$, $A_3$ between two consecutive elementary generators 214, 216, 218 of the same generator 202. Consequently, the three direct voltage generators 200, 202, 204 comprise seven elementary direct voltage generators 206, 208, 210, 212, 214, 215, 216, 218 connected in series between the two input voltage terminals $V_+$, $V_-$.

The seven elementary voltage generators, 206, 208, 210, 212, 214, 216 and 218 deliver the voltages E1, E2, E3, E4, E5, E6 and E7 volts, respectively, with, for example, E1=E2=E3=E4=E5=E6=E7=E/7, the seven voltages then being identical. By way of variation, the voltages are different.

The 8-level voltage inverter further comprises two so-called lateral commutation branches 10, 11 which are each connected between one of the two input voltage terminals $V_+$, $V_-$ and an output terminal $V_S$. The two lateral commutation branches 10, 11 are identical and each comprise three commutation cells 220, 222, 224 and 226, 228, 230, connected in series by a middle point $C_1$, $C_2$, $C_3$, $C_4$, respectively. Each commutation cell comprises at least one switch bidirectional in terms of current, so that all the switches bidirectional in terms of current of the two lateral commutation branches 10, 11 are connected in series and are connected in the same direction; each bidirectional switch comprising an IGBT transistor and a diode connected in antiparallel.

The 8-level voltage inverter further comprises a controller for the commutation cells 220, 222, 224, 226, 228, 230 of the two lateral commutation branches 10, 11. The means for effecting commutation of the six commutation cells 220, 222, 224, 226, 228 and 230 of the two lateral commutation branches 10, 11 are means for effecting the simultaneous commutation of the IGBT transistors of the at least one bidirectional switch of one commutation cell 220, 222, 224, 226, 228, 230.

The 8-level voltage inverter further comprises four other, so-called central commutation branches 232, 234, 236, 238. The four central commutation branches 232, 234, 236, 238 are each connected between the middle point $A_i$ connecting the two elementary generators of one direct voltage generator 200, 202, 204 and the middle point $C_i$ connecting two commutation cells of one lateral commutation branch 10, 11, where i is an integer and $1 \leq i \leq 4$. They each comprise a pair 232, 234, 236, 238 of commutation cells bidirectional in terms of voltage and current. The two commutation cells 240 and 242, 244 and 246, 248 and 250, 252 and 254 of one pair 232, 234, 236, 238 of commutation cells bidirectional in terms of voltage and current are connected in series head-to-tail and are connected by a middle point $D_1$, $D_2$, $D_3$, $D_4$, respectively. Each commutation cell 240, 242, 244, 246, 248, 250, 252, 254 of the four central commutation branches 232, 234, 236, 238 comprises at least one switch bidirectional in terms of current, the direction of which is the same as that of the commutation cell. Each switch bidirectional in terms of current of a commutation cell of a pair 232, 234, 236, 238 of commutation cells bidirectional in terms of voltage and current comprises an IGBT transistor and a diode connected in antiparallel.

The 8-level voltage inverter further comprises a controller for effecting commutation of the commutation cells of the four central commutation branches 232, 234, 236, 238. The controller effects the simultaneous commutation of the two commutation cells of one pair of commutation cells bidirectional in terms of voltage and current 240 and 242, 244 and 246, 248 and 250 and finally 252 and 254. They control the simultaneous commutation of the IGBT transistors of the bidirectional switches of one commutation cell 240, 242, 244, 246, 248, 250, 252, 254.

The 8-level voltage inverter further comprises two pairs 256, 258 of diode cells 260, 262, 264 and 266. Each pair of diode cells 256, 258 is connected between a middle point $C_i$ of one of the two lateral commutation branches 10 and a middle point $C_{N-2+i}$ of the other of the two lateral commutation branches 11. Each diode cell 260, 262, 264, 266 comprises at least one diode. The diodes of the diode cells of one pair 256, 258 of diode cells are mounted in series and are connected in the same direction between the two middle points $D_1$, $D_3$ and $D_2$, $D_4$, respectively, of the pairs of commutation cells bidirectional in terms of voltage and current of two of the four central commutation branches 232, 236 and 234, 238, so that the cathode of one diode cell 260, 264 of each pair of diode cells 256, 258 is connected to a middle point $D_1$, $D_2$ of a lateral commutation branch 232, 234 and the anode of one diode cell 262, 266 of each pair of diode cells 256, 258 is connected to a middle point $D_3$, $D_4$ of another lateral commutation branch 236, 238. The middle point situated between the diode cells 260, 262 and 264, 266 of each pair of diode cells 256, 258 is connected to the middle points between two consecutive generators $B_1$ and $B_2$, respectively.

The operation of such an inverter is identical with that described for the 5-level voltage inverter.

In another embodiment, in order to conserve equipotentiality at the terminals of each commutation cell or diode cell and thus support the maximum reference voltage of E/7:

the commutation cells 222, 228 of the lateral commutation branches 10, 11 and the commutation cells 246, 250 of the central commutation branches 234 and 236 comprise three series connected switches bidirectional in terms of current which are connected in the same direction and are controlled simultaneously by the control unit;

the commutation cells 220, 224, 226, 228 of the lateral commutation branches 10, 11 connected directly to one of the two input voltage terminals $V_+$, $V_-$ or to the outlet terminal of a current $V_S$, and the commutation cells 244, 248 of the central commutation branches 234 and 236 connected directly to a middle point $A_2$, $A_3$ between two elementary generators 214, 216, 218 of the generator 202 comprise two series connected switches bidirectional in terms of current which are connected in the same direction and are controlled simultaneously by the control unit;

the diode cells 262 and 264 comprise two series connected diodes which are connected in the same direction;

the other commutation cells 240, 242, 252, 254 of the other central commutation branches 232, 238 connected directly to a middle point $A_1$, $A_4$ between two elementary generators 206, 208, 210, 212 of one of the two terminal generators 200, 204 connected directly to one of the two input voltage terminals $V_+$, $V_-$ comprise a switch bidirectional in terms of current of the same direction as their commutation cell; and the other diode cells 260, 266, connected directly to a pair 232, 238 of commutation cells bidirectional in terms of voltage and current connected to a middle point $A_1$, $A_4$ between two elementary generators 206, 208, 210, 212 of one of the two terminal generators 200, 204 connected directly to one of the two input voltage terminals $V_+$, $V_-$, comprise a diode of the same direction as their diode cell.

In total, an 8-level EPP voltage inverter comprises 34 diodes and 28 IGBT transistors, while a conventional NPC voltage inverter comprises 56 diodes and 14 IGBT transistors.

In particular embodiments, additional balancing resistors are advantageously connected in parallel with each active element, that is to say transistor and diode, in order to ensure a maximum voltage of E/7.

Although the above description relates to 5- and 8-level voltage inverters, the present invention is applicable to any 3N−4-level voltage inverter where N is an integer greater than or equal to 3.

The invention claimed is:

1. A voltage inverter comprising:
two input voltage terminals ($V_+$, $V_-$);
N−1 direct voltage generators which are connected in series between the two input voltage terminals ($V_+$, $V_-$) and are connected together by a middle point ($B_i$, i being an integer and $1 \leq i \leq (N-2)$), two terminal generators of the N−1 generators being connected directly to one of the two input voltage terminals, wherein the N−1 generators include 3N−5 series connected elementary direct voltage generators, the two terminal generators of the N−1 generators connected directly to one of the two input voltage terminals ($V_+$, $V_-$) including two elementary direct voltage generators and the other generators of the N−1 generators including three elementary generators, the elementary generators of one generator being series connected by a middle point ($A_i$, i being an integer and $1 \leq i \leq 2 \times (N-2)$);
two first commutation branches each connected between an output terminal ($V_S$) and one of the two input voltage terminals ($V_+$, $V_-$), each commutation branch comprising N−1 series connected commutation cells connected together by a middle point ($C_i$, i being an integer and $1 \leq i \leq 2 \times (N-2)$);
a controller for the commutation cells of the two first commutation branches;
2N−4 other commutation branches which are each connected between one of the middle points ($A_i$) connecting two elementary generators of one generator and one of the middle points ($C_i$) connecting two commutation cells of one commutation branch, each branch of the 2N−4 other commutation branches comprising a pair of commutation cells bidirectional in terms of voltage and current, the two commutation cells of one pair of commutation cells bidirectional in terms of voltage and current being connected by a middle point ($D_i$, i being an integer and $1 \leq i \leq 2 \times (N-2)$);
N−2 pairs of diode cells, each pair of diode cells being connected between a middle point (Di) of one of the 2N−4 other commutation branches and a middle point (Dn−2+i) of a different one of the 2N−4 other commutation branches, each diode cell of the N−2 pairs of diode cells including at least one diode; the diodes of the diode cells of one pair of diode cells being series connected, in the same direction, and being connected together by a middle point (Bi) connecting two consecutive generators of the N−1 direct voltage generators; and
a controller for effecting commutation of the commutation cells of said 2N−4 other commutation branches.

2. The voltage inverter according to claim 1, wherein the two commutation cells of one pair of commutation cells bidirectional in terms of voltage and current each comprise at least one switch bidirectional in terms of current and are connected in series head-to-tail and are connected by the middle point ($D_i$).

3. The voltage inverter according to claim 1, wherein each of the 2N−2 commutation cells of the two first commutation branches comprises at least one switch bidirectional in terms of current, so that all the bidirectional switches of the 2N−2 commutation cells are series connected and are connected in the same direction.

4. The voltage inverter according to claim 1, wherein the controller for effecting commutation of the 2N−2 commutation cells of the two first commutation branches effects the simultaneous commutation of the at least one bidirectional switch of one commutation cell.

5. The voltage inverter according to claim 1, wherein the controller for effecting commutation of the commutation cells of said 2N−4 other commutation effects the simultaneous commutation of the commutation cells of one pair of commutation cells bidirectional in terms of voltage and current of each of said 2N−4 other commutation branches, the commutation of each commutation cell of each of said 2N−4 other commutation branches being effected by the commutation of the at least one bidirectional switch of said commutation cell.

6. The voltage inverter according to claim 1, wherein the 3N−5 are identical and are to impose the same voltage.

7. The voltage inverter according to claim 6, wherein the controller for the commutation cells of the two first commutation branches and the controller for effecting commutation of the commutation cells of said 2N−4 other commutation branches comprises a control unit.

8. The voltage inverter according to claim 7, wherein, in order to conserve equipotentiality at the terminals of each commutation cell and of each diode cell:

the diode cells connected directly to a pair of commutation cells bidirectional in terms of voltage and current connected to a middle point ($A_1$, $A_4$) between two elementary generators of one of the terminal generators of the N−1 generators connected directly to one of the two input voltage terminals ($V_+$, $V_-$), include a diode of the same direction as their diode cell;

the other diode cells include two series connected diodes connected in the same direction;

the commutation cells of the 2N−4 other commutation branches connected directly to a middle point ($A_1$, $A_4$) between two elementary generators of one of the two terminal generators of the N−1 generators connected directly to one of the two input voltage terminals ($V_+$, $V_-$), include a switch bidirectional in terms of current;

the commutation cells of the two first commutation branches connected directly to one of the two input voltage terminals ($V_+$, $V_-$) or to the output terminal of a current ($V_S$) comprise two series connected switches bidirectional in terms of current connected in the same direction and controlled simultaneously by the control unit;

the commutation cells of the 2N−4 other commutation branches connected directly to a middle point ($A_2$, $A_3$) between two elementary generators of the other generators of the N−1 generators consisting in three elementary generators comprise two series connected switches bidirectional in terms of current connected in the same direction and controlled simultaneously by the control unit;

the other commutation cells of the two first commutation branches and the other commutation cells of the 2N−4 other commutation branches comprise three series connected switches bidirectional in terms of current connected in the same direction and controlled simultaneously by the control unit.

9. The voltage inverter according to claim 1, wherein each of the switches bidirectional in terms of current of the commutation cells comprises an IGBT transistor and a diode connected in antiparallel.

10. The voltage inverter according to claim 9, wherein each IGBT transistor has a balancing resistor in parallel in order to ensure a maximum voltage at its terminals.

11. The voltage inverter according to claim 1, wherein each diode has a balancing resistor in parallel in order to ensure a maximum voltage at its terminals.

* * * * *